(12) United States Patent
Chen et al.

(10) Patent No.: US 10,643,307 B2
(45) Date of Patent: May 5, 2020

(54) SUPER-RESOLUTION BASED FOVEATED RENDERING

(71) Applicant: Intel Corporation, Santa Clara, CA (US)

(72) Inventors: Fan Chen, Portland, OR (US); Zhengmin Li, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/809,344

(22) Filed: Nov. 10, 2017

(65) Prior Publication Data
US 2019/0026864 A1 Jan. 24, 2019

(51) Int. Cl.
*G06T 3/40* (2006.01)

(52) U.S. Cl.
CPC .......... *G06T 3/4053* (2013.01); *G06T 3/4046* (2013.01)

(58) Field of Classification Search
CPC ..... G06T 3/4046; G06T 3/4053; G06T 5/003; G06T 5/20; G06T 7/00; G06T 11/00; G06T 3/4038; G06T 2207/20104; G06T 3/40; G06T 2207/20021; G06N 3/02; G06N 3/08; G06N 99/005; H04N 21/4728
USPC .......................................................... 345/428
See application file for complete search history.

(56) References Cited

U.S. PATENT DOCUMENTS

| | | | | |
|---|---|---|---|---|
| 6,184,935 B1* | 2/2001 | Iaquinto | ..................... | G06T 1/60 348/441 |
| 7,499,594 B2* | 3/2009 | Kortum | ................ | H04N 19/162 382/239 |
| 9,521,457 B2* | 12/2016 | Jeon | .................... | H04N 21/2146 |
| 2004/0184657 A1* | 9/2004 | Lin | ........................ | G06T 3/4007 382/159 |
| 2011/0222783 A1* | 9/2011 | Matsunobu | ............. | G06T 3/403 382/218 |
| 2011/0261179 A1* | 10/2011 | Fomitchov | ............... | H04N 7/18 348/77 |
| 2011/0274370 A1* | 11/2011 | Kondo | .................. | G06T 3/4053 382/284 |
| 2014/0375865 A1* | 12/2014 | Shroff | ....................... | G06T 5/00 348/333.12 |
| 2015/0324952 A1* | 11/2015 | Namboodiri | .......... | G06T 3/4038 345/428 |
| 2015/0363634 A1* | 12/2015 | Yin | ..................... | G06K 9/00221 382/118 |
| 2016/0063677 A1* | 3/2016 | Deamo | ................. | G06T 3/4053 382/199 |
| 2016/0093023 A1* | 3/2016 | Prasad | ................. | G06K 9/3241 382/173 |
| 2016/0275354 A1* | 9/2016 | Andalo | ................ | H04N 19/124 |
| 2016/0292827 A1* | 10/2016 | Holland | ................ | G06T 3/4023 |

(Continued)

OTHER PUBLICATIONS

Sermanet, Pierre, et al. "Overfeat: Integrated recognition, localization and detection using convolutional networks." arXiv preprint arXiv:1312.6229 (2013).*

(Continued)

*Primary Examiner* — Haixia Du

(74) *Attorney, Agent, or Firm* — Green, Howard & Mughal LLP.

(57) ABSTRACT

An embodiment of a semiconductor package apparatus may include technology to identify a region of interest portion of a first image, and render the region of interest portion with super-resolution. Other embodiments are disclosed and claimed.

18 Claims, 11 Drawing Sheets

(56) References Cited

U.S. PATENT DOCUMENTS

2017/0094243 A1\* 3/2017 Venkataraman ... H04N 13/0007
2018/0068634 A1\* 3/2018 Yoo ........................... G06T 1/20

OTHER PUBLICATIONS

Dugad, R., & Ahuja, N. (2001). A fast scheme for image size change in the compressed domain. IEEE Transactions on Circuits and Systems for Video Technology, 11(4), 461-474. (Year: 2001).\*
Dong et al., "Accelerating the Super-Resolution Convolutional Neural Network", Department of Information Engineering, The Chinese University of Hong Kong, 2016, pp. 1-17.
Marco Chiappetta, "NVIDIA to Demonstrate Foveated Rendering Tech to Reduce VR Workloads, Mimic Human Visual Systems", retrieved from hothardware.com/news/nvidia-to-demonstrate-foveated-rendering-technology-to-reduce-vr-workloads#FBCJCAC5UZXWBSUS.99, Jul. 21, 2016, 4 pages.
U.S. Appl. No. 15/476,990, entitled "Predictive Viewport Renderer and Foveated Color Compressor", filed Apr. 1, 2017, 154 pages.
U.S. Appl. No. 15/477,019, entitled "Motion Biased Foveated Renderer", filed Apr. 1, 2017, 163 pages.

\* cited by examiner

SUPER-RESOLUTION BASED FOVEATED RENDERING

TECHNICAL FIELD

Embodiments generally relate to graphics systems. More particularly, embodiments relate to super-resolution based foveated rendering.

BACKGROUND

After an image is rendered by a graphics engine, the image may be encoded for display, transmission, and/or file storage. Fovea may refer to a small depression in the retina of the eye where visual acuity may be highest. The center of the field of vision may be focused in this region, where retinal cones may be particularly concentrated. In the context of some graphics applications, a fovea or a foveated area may correspond to a region of interest in an image or display.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
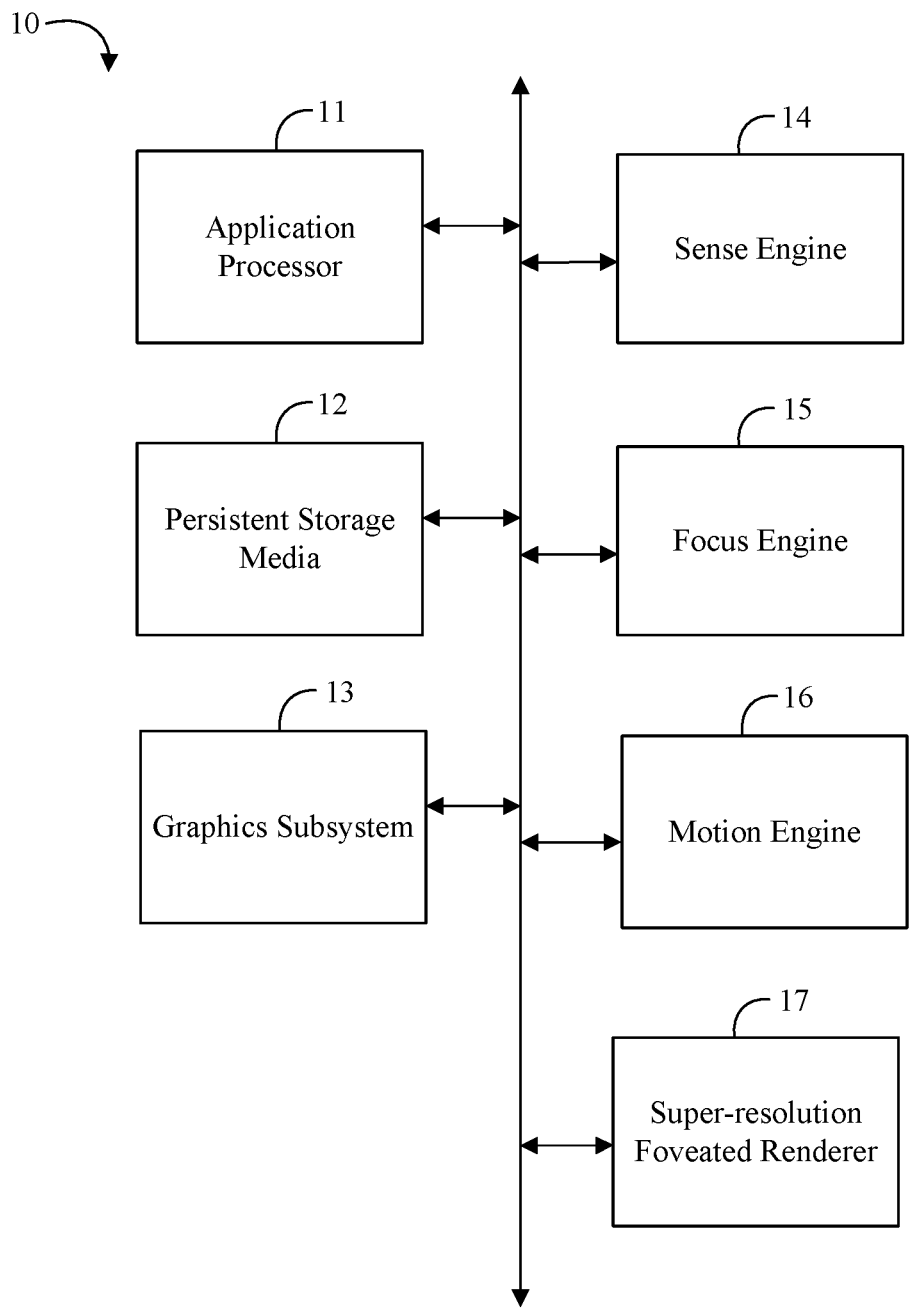
FIG. 1 is a block diagram of an example of an electronic processing system according to an embodiment.

Turning now to FIG. 1, an embodiment of an electronic processing system 10 may include an application processor 11, persistent storage media 12 communicatively coupled to the application processor 11, and a graphics subsystem 13 communicatively coupled to the application processor 11. The system 10 may further include a sense engine 14 communicatively coupled to the graphics subsystem 13 to provide sensed information, a focus engine 15 communicatively coupled to the sense engine 14 and the graphics subsystem 13 to provide focus information, a motion engine 16 communicatively coupled to the sense engine 14, the focus engine 15, and the graphics subsystem 13 to provide motion information, and a super-resolution foveated renderer 17 communicatively coupled to the focus engine 15 to render a region of interest of an image with super-resolution based on the focus information.

In some embodiments of the system 10, the super-resolution foveated renderer 17 may be incorporated in, or integrated with, the graphics subsystem 13 as part of a render pipeline. For example, the render pipeline may perform most of its render operations on medium quality images. Advantageously, working with medium quality images may reduce the computational intensity, memory requirements, and/or local/network transmission bandwidth for the graphics subsystem 13. For example, the region of interest portion of the medium quality images may be identified based on the focus information and provided to a super-resolution network to generate super-resolution enhanced images. The medium quality images may then be up-sampled and combined with the super-resolution enhanced images to provide foveated images.

In some embodiments, some portions of the graphics subsystems may be implemented on a host system while other portions may be implemented on a client system. For example, the host system may be a server or cloud service, while the client system may be a user device such as a personal computer, laptop, tablet computer, smartphone, etc. In another example, the host system may be the user's own personal computer, laptop, etc., while the client system may be a handheld or wearable device (e.g., a tablet or smartphone for gaming, a headset virtual reality (VR), an eyeglass display for augmented reality (AR)/merged reality (MR), etc.). The client system may be connected wired (e.g., via USB) or wirelessly (e.g., via WIFI) to the host system. For wireless embodiments, the super-resolution portion of the render pipeline may be included on the client system to advantageously reduce the network transmission bandwidth over the wireless connection between the host system and the client system.

Embodiments of each of the above application processor 11, persistent storage media 12, graphics subsystem 13, sense engine 14, focus engine 15, motion engine 16, super-resolution foveated renderer 17, and other system components may be implemented in hardware, software, or any suitable combination thereof. For example, hardware implementations may include configurable logic such as, for example, programmable logic arrays (PLAs), FPGAs, complex programmable logic devices (CPLDs), or in fixed-functionality logic hardware using circuit technology such as, for example, ASIC, complementary metal oxide semiconductor (CMOS) or transistor-transistor logic (TTL) technology, or any combination thereof. Alternatively, or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system applicable/appropriate programming languages, including an object-oriented programming language such as PYTHON, PERL, JAVA, SMALLTALK, C++, C# or the like and conventional procedural programming languages, such as the "C" programming language or similar programming languages.

Sense Engine Examples

Figure 2:
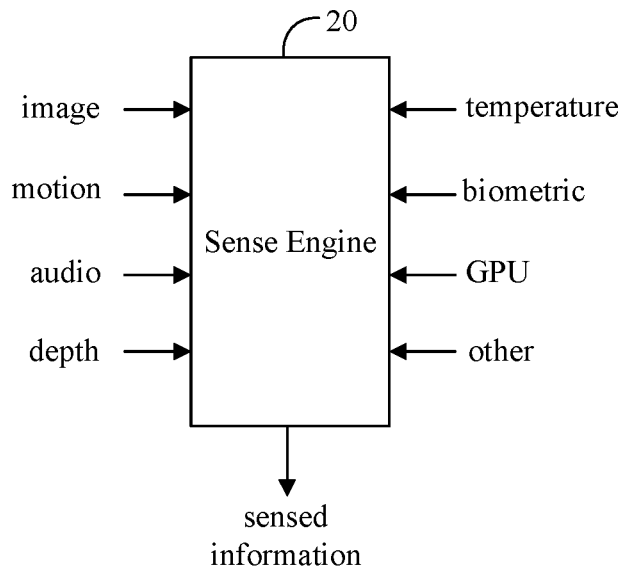
FIG. 2 is a block diagram of an example of a sense engine according to an embodiment.

Turning now to FIG. 2, a sense engine 20 may get information from sensors, content, services, and/or other sources to provide sensed information. The sensed information may include, for example, image information, audio information, motion information, depth information, temperature information, biometric information, graphics processor unit (GPU) information, etc. At a high level, some embodiments may use sensed information to adjust video render parameters of the graphics system.

For example, a sense engine may include a sensor hub communicatively coupled to two dimensional (2D) cameras, three dimensional (3D) cameras, depth cameras, gyroscopes, accelerometers, inertial measurement units (IMUs), first and second order motion meters, location services, microphones, proximity sensors, thermometers, biometric sensors, etc., and/or a combination of multiple sources which provide information to the focus and/or motion engines. The sensor hub may be distributed across multiple devices. The information from the sensor hub may include or be combined with input data from the user's devices (e.g., touch data).

For example, the user's device(s) may include one or more 2D, 3D, and/or depth cameras. The user's device(s) may also include gyroscopes, accelerometers, IMUs, location services, thermometers, biometric sensors, etc. For example, the user may wear a head-mounted display (HMD) which includes a variety of cameras, motion sensors, and/or other sensors. A non-limiting example of a mixed reality HMD includes the MICROSOFT HOLOLENS. The user may also carry a smartphone (e.g., in the user's pocket) and/or may wear a wearable device (e.g., such as a smart watch, an activity monitor, and/or a fitness tracker). The user's device(s) may also include a microphone which may be utilized to detect if the user is speaking, on the phone, speaking to another nearby person, etc. The sensor hub may include some or all of the user's various devices which are capable of capturing information related to the user's actions or activity (e.g., including an input/output (I/O) interface of the user devices which can capture keyboard/mouse/touch activity). The sensor hub may get information directly from the capture devices of the user's devices (e.g., wired or wirelessly) or the sensor hub may be able to integrate information from the devices from a server or a service (e.g., information may be uploaded from a fitness tracker to a cloud service, which the sensor hub may download).

Focus Engine Examples

Figure 3:
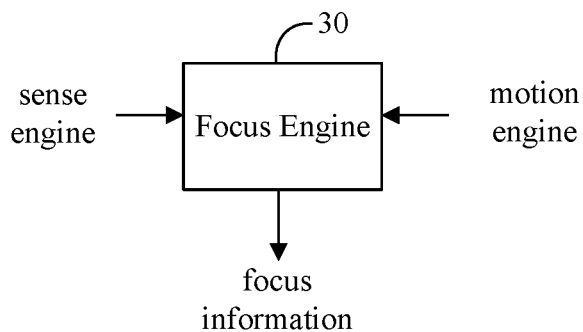
FIG. 3 is a block diagram of an example of a focus engine according to an embodiment.

Turning now to FIG. 3, a focus engine 30 may get information from the sense engine and/or motion engine and other sources to provide focus information. The focus information may include, for example, a focal point, a focus area, an eye position, eye motion, pupil size, pupil dilation, depth of focus (DOF), a content focal point, a content focus object, a content focus area, etc. The focus information may also include prior focus information, determined future focus information, and/or predicted focus information (e.g., a predicted focal point, a predicted focus area, a predicted eye position, predicted eye motion, predicted pupil size, predicted pupil dilation, predicted DOF, determined future content focal point, determined future content focus object, determined future content focus area, predicted content focal point, predicted content focus object, predicted content focus area, etc.).

At a high level, some embodiments may use focus information to identify region of interest (ROI) parameters of the graphics system based on 1) where the user is assumed to be looking, 2) where the user is determined to be looking, 3) where an application wants the user to look, and/or 4) where the user is predicted to be looking in the future. Some focus cues may be stronger in the focal region of where the user is looking. If the user is looking straight ahead they may see things in sharp focus. With scenes or objects towards the periphery, the user may notice motion but not details in sharp focus.

For example, the focus information may be static and/or based on assumptions (e.g., the user may be assumed to be looking at the center of screen with fixed eye position, DOF, etc.), if there is limited sensed information or processing capability of the graphics system (e.g., an attached HMD or host cannot provide or make use of the information). The focus information may also change dynamically based on factors such as motion information (e.g., from a virtual reality (VR) headset), motion prediction information, content information (e.g., motion in the scene), etc. More preferably, a better user experience may be provided with a rich sensor set including eye tracking (e.g., sometimes also referred to as gaze tracking) to identify the focus region and provide the focus information. Some embodiments, for example, may include an eye tracker or get eye information from an eye tracker to track the user's eyes. The eye information, may include eye position, eye motion, pupil size/dilation, depth of focus, etc. An eye tracker may capture an image of the user's eye, including the pupil. The user's focal point and/or DOF may be determined, inferred, and/or estimated based on the eye position and pupil dilation. The user may go through a calibration process which may help the eye tracker provide more accurate focus and/or DOF information.

When a user is wearing a VR headset, for example, a camera may capture an image of a pupil and the system may determine where the user is looking (e.g., a focus area, depth, and/or direction). The camera may capture pupil dilation information and the system may infer where the user's focus area is based on that information. For example, a human eye has a certain DOF such that if the person is focusing on something nearby, things farther away may be blurred. The focus information may include a focal point at a focus distance X, and DOF information of delta(X), so the focus area may correspond to X+/−delta[X] positioned around at the user's focal point. The size of the DOF may vary with the distance X (e.g., a different delta at different focus distances). For example, the user's DOF may be calibrated and may vary in each direction (e.g., x, y, and z) such that the function delta[X] may not necessarily be spherical.

In some embodiments, the focus information may include content-based focus information. For example, in a 3D, VR, augmented reality (AR), and/or merged reality environment, depth and/or distance information may be provided from an application (e.g., where user is in the virtual environment, where objects are, and/or how far the objects are from the user, etc.). Content-based focus information may also include a point, object, or area in the content where the application wants the user to focus, such as something more interesting happening that the application wants the user's attention. The application may also be able to provide future content focus information because the application may know motion information for the content and/or what objects/areas in a next frame or scene may be of more interest to the user (e.g., an object about to enter the scene from an edge of the screen).

Motion Engine Examples

Figure 4:
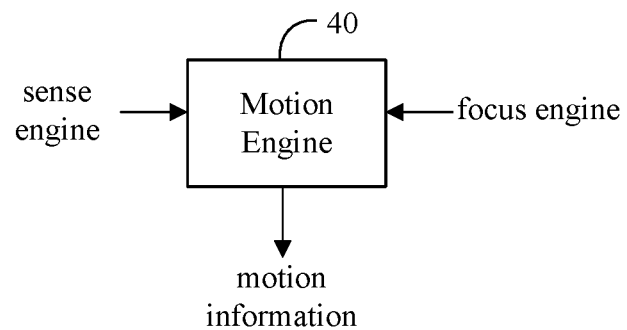
FIG. 4 is a block diagram of an example of a motion engine according to an embodiment.

Turning now to FIG. 4, a motion engine 40 may get information from the sense engine and/or focus engine and other sources to provide motion information. The motion information may include, for example, head position, head velocity, head acceleration, head motion direction, eye velocity, eye acceleration, eye motion direction, object position, object velocity, object acceleration, object motion direction, etc. The motion information may also include prior motion information, determined future motion information, and/or predicted motion information (e.g., a predicted head velocity, a predicted head acceleration, a predicted head position, a predicted head motion direction, a predicted eye velocity, a predicted eye acceleration, a predicted eye motion direction, determined future content position, determined future content object velocity, determined future content object acceleration, predicted object position, predicted object velocity, predicted object acceleration, etc.).

At a high level, some embodiments may use motion information to adjust video render parameters of the graphics system based on 1) the user moving their head, 2) the user moving their eyes, 3) the user moving their body, 4) where an application wants the user to turn their head, eyes, and/or body, and/or 4) where the user is predicted to turn their head, eyes, and/or body in the future. Some motion information may be determined readily from the sensed information. For example, head position, velocity, acceleration, motion direction, etc. may be determined from an accelerometer. Eye motion information may be determined by tracking eye position information over time (e.g., if the eye tracker provides only eye position information).

Some motion information may be content-based. In a game or on-the-fly 3D content, for example, the application may know how quickly and where the objects are moving. The application may provide the information to the motion engine (e.g., through an API call). Future content-based object motion information for a next frame/scene may also be fed into the motion engine for decision making. Some content-based motion information may be determined by image processing or machine vision processing the content.

Some embodiments of a machine vision system, for example, may analyze and/or perform feature/object recognition on images captured by a camera. For example, machine vision and/or image processing may identify and/or recognize objects in a scene (e.g., that an edge belongs to a front of a chair). The machine vision system may also be configured to perform facial recognition, gaze tracking, facial expression recognition, and/or gesture recognition including body-level gestures, arm/leg-level gestures, hand-level gestures, and/or finger-level gestures. The machine vision system may be configured to classify an action of the user. In some embodiments, a suitably configured machine vision system may be able to determine if the user is present at a computer, typing at a keyboard, using the mouse, using the trackpad, using the touchscreen, using a HMD, using a VR system, sitting, standing, and/or otherwise taking some other action or activity.

For example, the motion engine may get camera data related to a real object in a scene and may use that information to identify motion and orientation of the real object. The motion engine may get latency information from the graphics processor. The motion engine may then predict the next frame orientation of that real object. The amount of latency may be based on one or more of time to render and/or encode a scene, number of virtual objects in the scene, and a complexity of the scene, etc. For example, a sense engine may include one or more cameras to capture a real scene. For example, the one or more cameras may include one or more 2D cameras, 3D cameras, depth cameras, high speed cameras, or other image capture devices. The real scene may include an object moving in the scene. The cameras may be coupled to an image processor to process data from the cameras to identify objects in the scene (e.g., including the moving object) and to identify motion of the object (e.g., including orientation information). The motion engine may determine predicted motion information based on tracking the motion of the object and predict a future position of the object based on a measured or estimated latency (e.g., from the time of capture to the time of rendering/encoding). In accordance with some embodiments, various motion tracking and/or motion prediction techniques may be augmented with optical flow and other real motion estimation techniques to determine the next location of the real objects. For example, some embodiments may use extended common filtering and/or perspective processing (e.g., from autonomous driving applications) to predict motion of objects.

Engine Overlap Examples

Those skilled in the art will appreciate that aspects of various engines described herein may overlap with other engines and that portions of each engine may be implemented or distributed throughout various portions of an electronic processing system. For example, the focus engine may use motion information to provide a predicted future focus area and the motion engine may use focus information to predict a future motion. Eye motion information may come directly from the sense engine, may be determined/predicted by the focus engine, and/or may be determined/predicted by the motion engine. The examples herein should be considered as illustrative and not limiting in terms of specific implementations.

Figure 5:
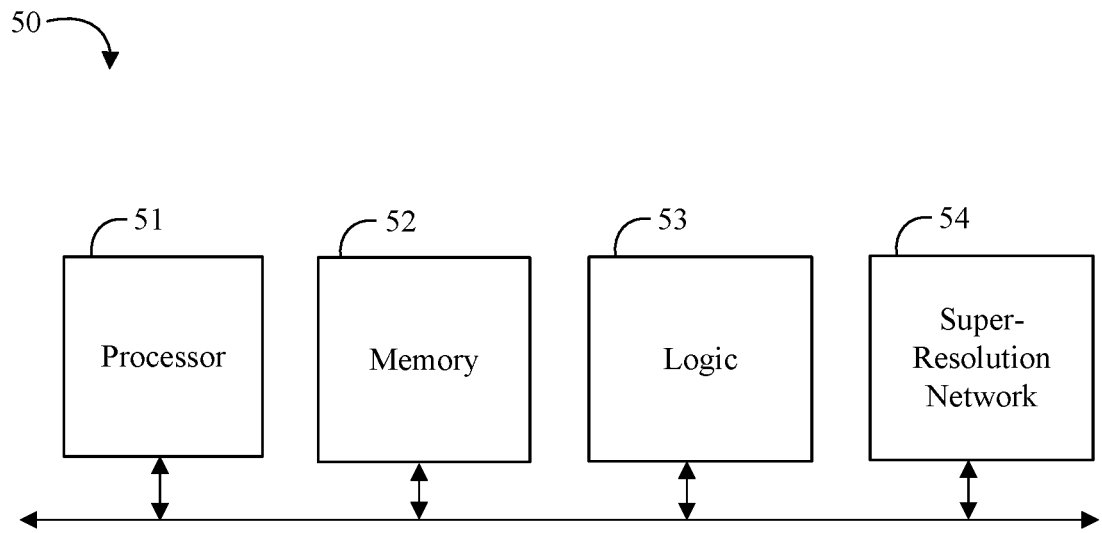
FIG. 5 is a block diagram of another example of a video processing unit according to an embodiment.

Turning now to FIG. 5, an embodiment of a video processing unit (VPU) 50 may include a graphics processor 51, memory 52 communicatively coupled to the graphics processor 51, and logic 53 communicatively coupled to the graphics processor 51 to identify a region of interest portion of a first image, and render the region of interest portion with super-resolution. In some embodiments, the logic 53 may be configured to provide the region of interest portion of the first image to a super-resolution network 54 to generate a super-resolution enhanced image, up-sample the first image to generate an up-sampled image, and combine the super-resolution enhanced image with the up-sampled image to provide a foveated image. For the example, another embodiment of the VPU 50 may have the logic 53 configured to train the super-resolution network 54 to provide a smooth transition between the region of interest portion of the first image and other portions of the first image. To prepare for training, the logic 53 may be configured to crop a training image based on the region of interest to generate a cropped image, down-sample the cropped image to generate a down-sampled image, up-sample the down-sampled image to generate an up-sampled image, and blend the up-sampled image with the cropped image to generate a target image. The logic 53 may be configured to then train the super-resolution network 54 with the down-sampled image as an input image for the super-resolution network 54 and the target image as a target output image for the super-resolution network 54. In some embodiments, a resolution of the first image may be lower than a resolution of a target display (e.g., the first image may be a medium quality image).

Embodiments of each of the above graphics processor 51, memory 52, logic 53, super-resolution network 54, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 52, persistent storage media, or other system memory may store a set of instructions which when executed by the graphics processor 51 cause the VPU 50 to implement one or more components, features, or aspects of the VPU 50 (e.g., the logic 53, identifying a region of interest portion of a first image, rendering the region of interest portion with super-resolution, etc.).

Figure 6:
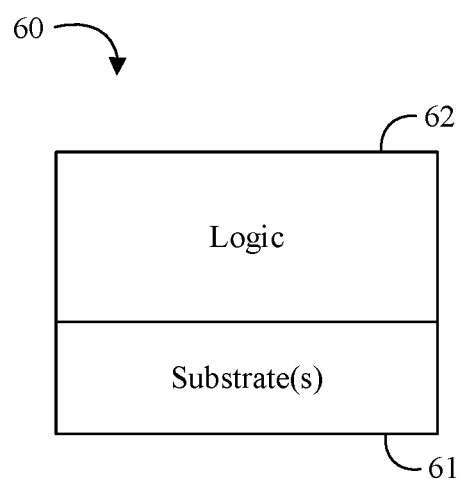
FIG. 6 is a block diagram of an example of a semiconductor package apparatus according to an embodiment.

Turning now to FIG. 6, an embodiment of a semiconductor package apparatus 60 may include one or more substrates 61, and logic 62 coupled to the one or more substrates 61, where the logic 62 is at least partly implemented in one or more of configurable logic and fixed-functionality hardware logic. The logic 62 coupled to the one or more substrates 61 may be configured to identify a region of interest portion of a first image, and render the region of interest portion with super-resolution. In some embodiments, the logic 62 may be configured to provide the region of interest portion of the first image to a super-resolution network to generate a super-resolution enhanced image, up-sample the first image to generate an up-sampled image, and combine the super-resolution enhanced image with the up-sampled image to provide a foveated image. For the example, another embodiment of the apparatus 60 may have the logic 62 configured to train the super-resolution network to provide a smooth transition between the region of interest portion of the first image and other portions of the first image. To prepare for training, the logic 62 may be configured to crop a training image based on the region of interest to generate a cropped image, down-sample the cropped image to generate a down-sampled image, up-sample the down-sampled image to generate an up-sampled image, and blend the up-sampled image with the cropped image to generate a target image. The logic 62 may be configured to then train the super-resolution network with the down-sampled image as an input image for the super-resolution network and the target image as a target output image for the super-resolution network. In some embodiments, a resolution of the first image may be lower than a resolution of a target display.

Embodiments of logic 62, and other components of the apparatus 60, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 7A:
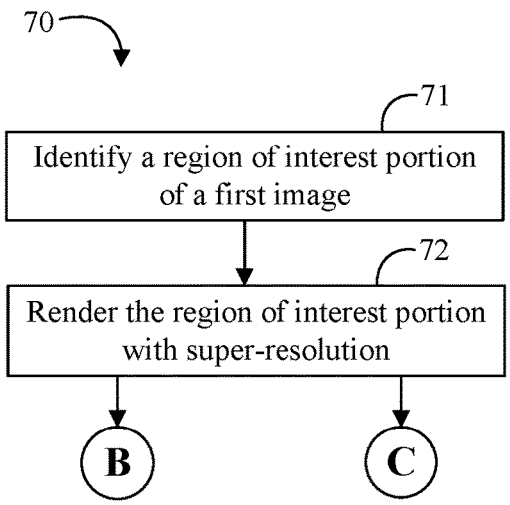
FIGS. 7A to 7C are flowcharts of another example of a method of adaptive encoding according to an embodiment.
Figure 7B:
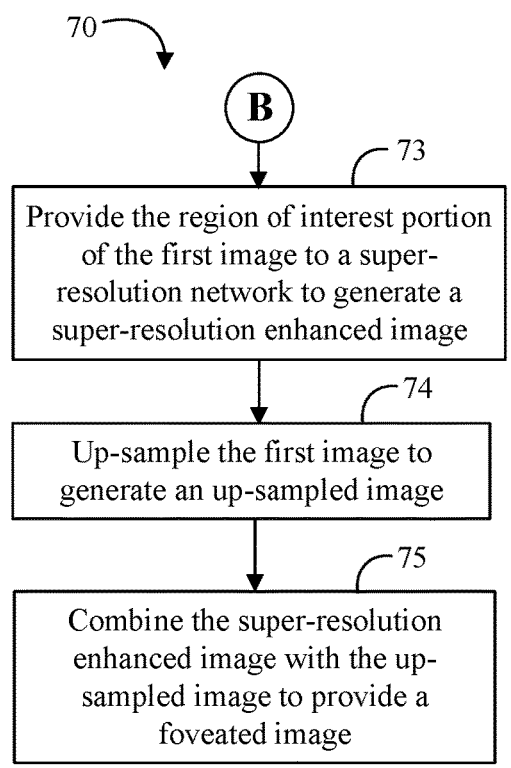
Figure 7C:
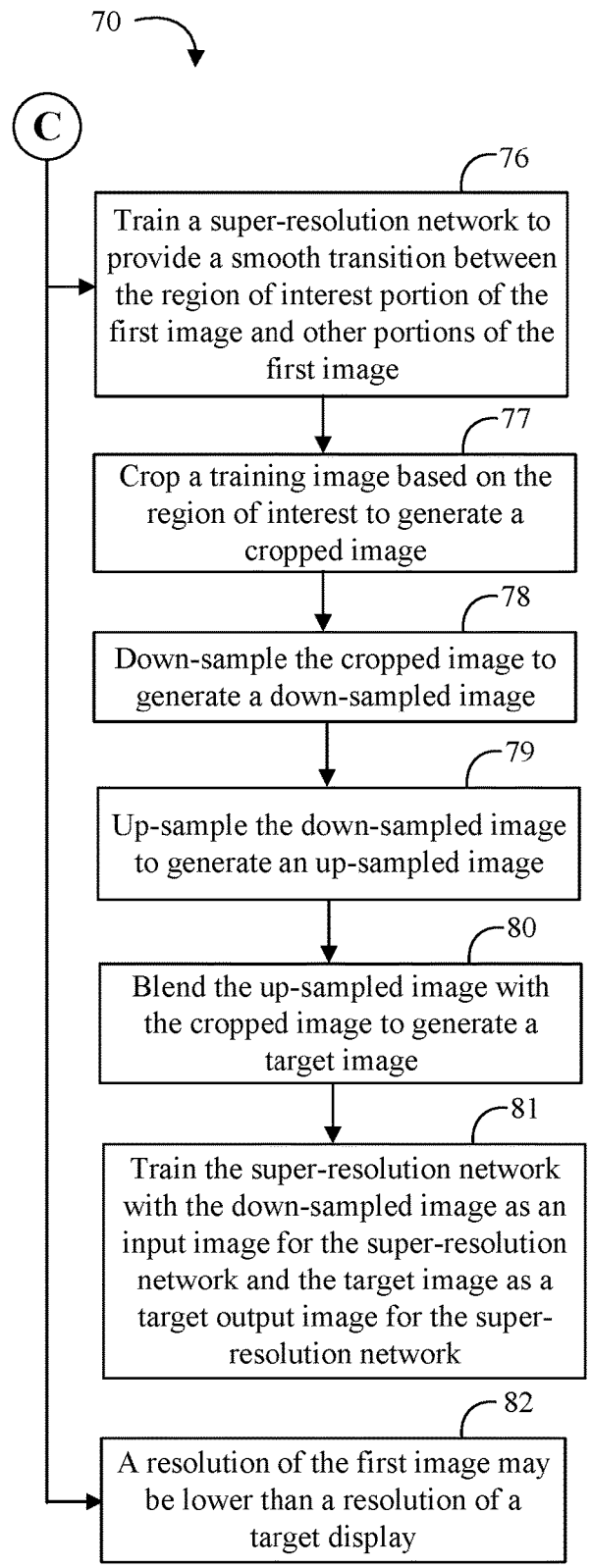

Turning now to FIGS. 7A to 7C, an embodiment of a method 70 of rendering an image may include identifying a region of interest portion of a first image at block 71, and rendering the region of interest portion with super-resolution at block 72. Some embodiments of the method 70 may include providing the region of interest portion of the first image to a super-resolution network to generate a super-resolution enhanced image at block 73, up-sampling the first image to generate an up-sampled image at block 74, and combining the super-resolution enhanced image with the up-sampled image to provide a foveated image at block 75.

Other embodiments of the method 70 may alternatively, or additionally, include training a super-resolution network to provide a smooth transition between the region of interest portion of the first image and other portions of the first image at block 76. For example, the method 70 may include cropping a training image based on the region of interest to generate a cropped image at block 77, down-sampling the cropped image to generate a down-sampled image at block 78, up-sampling the down-sampled image to generate an up-sampled image at block 79, and blending the up-sampled image with the cropped image to generate a target image at block 80. For example, the method 70 may then include training the super-resolution network with the down-sampled image as an input image for the super-resolution network and the target image as a target output image for the super-resolution network at block 81. In some embodiments of the method 70, a resolution of the first image may be lower than a resolution of a target display at block 82.

Embodiments of the method 70 may be implemented in a system, apparatus, computer, device, etc., for example, such as those described herein. More particularly, hardware implementations of the method 70 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 70 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 70 may be implemented on a computer readable medium as described in connection with Examples 19 to 24 below. Embodiments or portions of the method 70 may be implemented in firmware, applications (e.g., through an application programming interface (API)), or driver software running on an operating system (OS).

Some embodiments may advantageously provide super-resolution based foveated rendering in VR/MR applications. Foveated rendering may include technology which provides a trade-off between a better viewing experience and a higher hardware/computation cost when render high quality images on VR displays. Foveated rendering in VR/MR may render the highest quality imagery only at or near the center of the viewer's vision where the eye can detect sharp detail, while rendering lower quality imagery in the periphery of the viewer's vision where the eye is not tuned to pick up high resolution details. For example, foveated rendering may only render in higher resolution on a region of interest (ROI). For example, the ROI may be extracted from eye tracking devices on a VR headset. Some other foveated rendering techniques may down-sample the image quality in the peripheral vision portion of the image outside the ROI (e.g., by applying blur masks or the like). In contrast, some embodiments may utilize super-resolution to enhance the ROI. Advantageously, some embodiments may provide improved content quality while saving network bandwidth and/or rendering cost. For example, some embodiments may provide foveated rendering which includes applying super-resolution techniques on medium quality content for better savings of both rendering cost and transmitting cost of the image data.

One problem in foveated rendering is producing a smooth transition between the central vision with high pixel details (e.g., near the ROI) and the peripheral vision with less pixel details. For example, an abrupt transition might lead to visual artifacts and may distract the viewer or degrade the viewer experience. Advantageously, some embodiments may provide a framework to produce smoother transitions between the central vision and the peripheral vision. For example, some embodiments may provide a super-resolution technique that provides a smooth transition between low/medium resolution image regions and high resolution image regions. In some embodiments, a super-resolution neural network may be trained with synthesized foveated rendering images, so as to generate a foveated image with both high pixel resolution in the central view (e.g., super-resolution at the ROI) and a smooth transition in the peripheral view.

Advantageously, some embodiments may provide super-resolution based foveated rendering for VR/MR which may improve the VR experience by increasing visual quality (resolution) where the user is looking, enhance the quality of medium quality VR contents, so as to reduce the hardware requirement for a data collection, reduce GPU rendering power which may be important to enable VR on a typical user device (e.g., an average consumer device as opposed to a high end device), reduce network bandwidth/storage for transmitting and saving the VR contents, and/or provide a video processor unit (VPU) to efficiently handle a deep learning workload. Some embodiments may also advantageously compensate for a gap between the resolution of the original source (e.g., bounded by an HD, FULL HD, UHD, etc., image capturing device) and the potentially higher resolution of a VR display (e.g., HD on a UHD display panel, UHD on 8K display panel, etc.), where super-resolution on the foveated vision may provide a better trade-off between compute/network efficiency and viewing experience.

Figure 8:
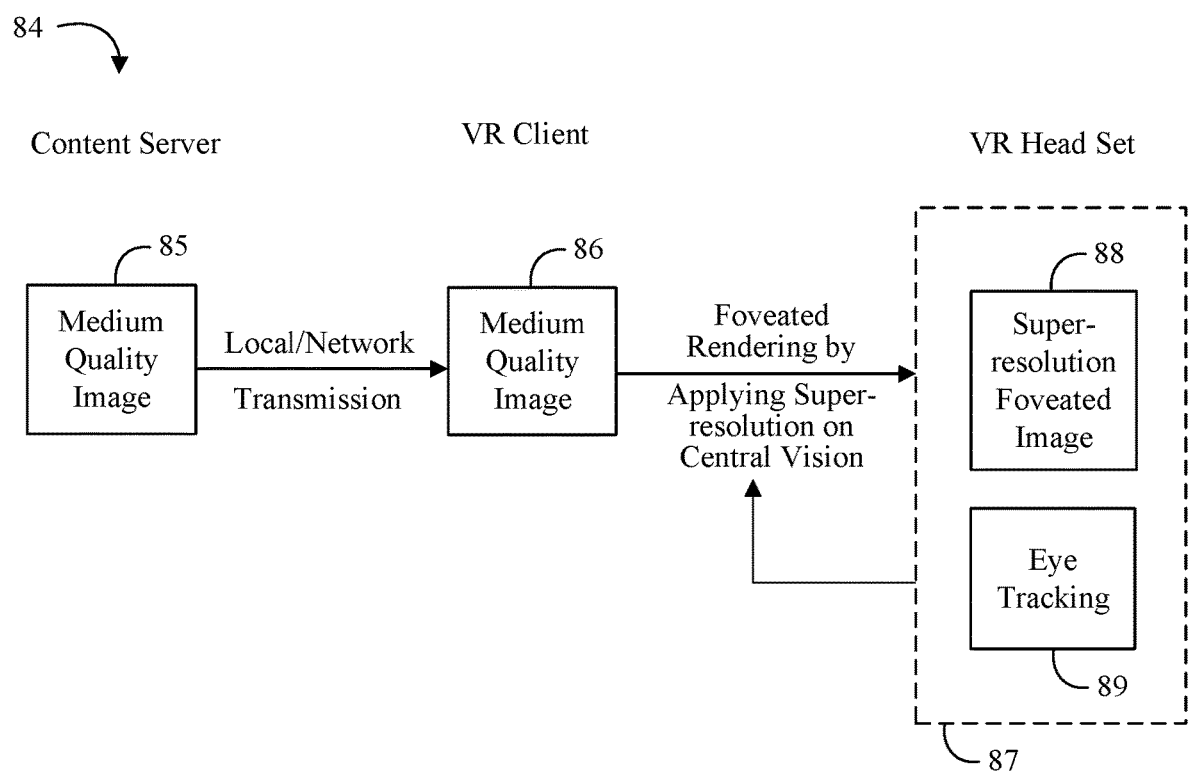
FIG. 8 is a workflow diagram of an example of a super-resolution based foveated rendering workflow according to an embodiment.

Turning now to FIG. 8, an embodiment of a super-resolution foveated rendering workflow 84 may include a content server 85 which may serve medium quality image content (e.g., via local/network transmission) to a VR client 86. The VR client 86 may process the medium image quality content as needed to display the content on a VR headset 87. The VR headset 87 may include a display panel 88 to display super-resolution foveated image content, and an eye tracker 89 to provide eye tracking information. For example, one or more of the VR client 86 and the VR headset 87 may identify a ROI portion of the medium quality image content based on the eye tracking information, and may include a render pipeline to render the identified ROI with super-resolution. In some embodiments, the render pipeline may be configured to provide the ROI portion to a super-resolution network to generate super-resolution enhanced image content, up-sample the medium quality image content to generate up-sampled image content, and combine the super-resolution enhanced image content with the up-sampled image content to provide the foveated image content for the display 88. The resolution of the medium quality image content may be lower than a resolution of the display 88. For example, the resolution of the medium quality image content may be 1920×1080 pixels (e.g., 1080p or FULL HD), while the resolution of the display may be 3840×2160 pixels (e.g., 4K). In some embodiments, the medium quality image content may be 4K resolution while the display resolution may be 7680×4320 pixels (e.g., 8K). In other words, medium quality may be considered as a relative quality between the original source content resolution and the target display resolution (e.g., 720p content vs a 1080p or 4K display, 1080p content vs a 4K or 8K display, etc.).

Some embodiments may provide a super-resolution technique/framework that may benefit from the foveated characteristic of the human vision. For example, some embodiments may train a super-resolution neural network with synthesized foveated rendering images, which may have high resolution details from super-resolution as well as a smooth transition from high-quality pixels to medium quality peripheral pixels. When the resulting foveated image is rendered on a VR display, for example, some embodiments may achieve less-visible boundaries between the central vision region and the peripheral vision regions to reduce or avoid artifact that may distract the viewer. An example of a suitable super-resolution neural network may include a convolutional neural network (CNN) such as super-resolution CNN (SRCNN) or a fast CNN such as a fast super-resolution CNN (FSRCNN).

Figure 9:
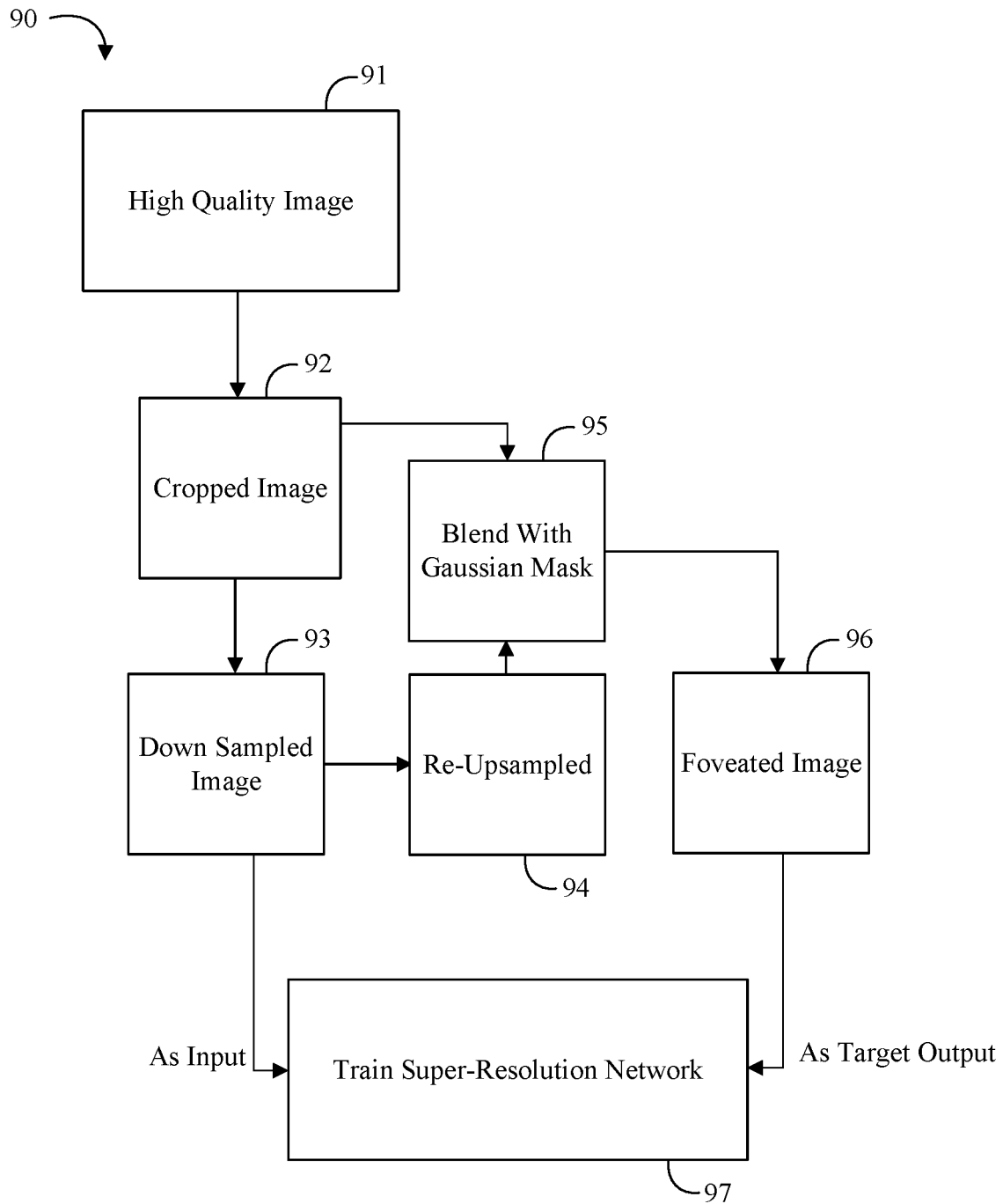
FIG. 9 is a workflow diagram of an example of a training workflow according to an embodiment.

Turning now to FIG. 9, an embodiment of a workflow 90 for training a super-resolution network based on foveated rendering may include starting with a dataset of high quality training images at block 90. For each high quality image in the original dataset, the image may be cropped at block 92 at randomly generated central vision positions. The cropped image may be intentionally down-sampled at block 93 and the down-sampled image may be re-up-sampled at block 94 (e.g., to simulate the up-sampling process in the testing phase). The training workflow 90 may then simulate the foveated rendering process by blending the re-up-sampled image with the cropped image at block 95 (e.g., with a pre-defined mask which defines the size of the central vision and the blurry characteristics of the peripheral vision) to generate a foveated image at block 96. The super-resolution neural network may then be trained at block 97 by feeding the down-sampled image as an input to the super-resolution neural network and feeding the generated foveated image to the super-resolution neural network as a target output of the super-resolution neural network. The result of the training may be a trained super-resolution network based on foveated rendering.

Figure 10:
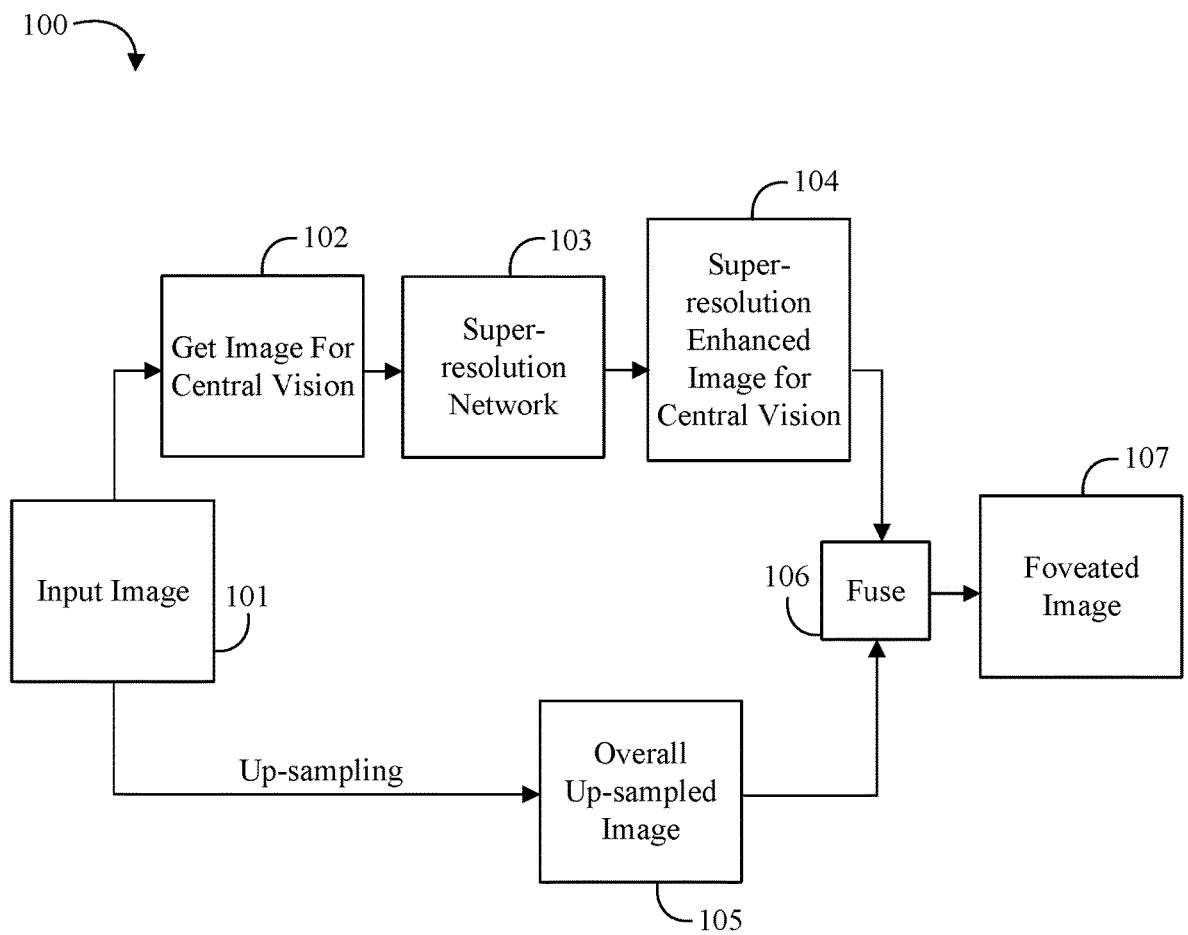
FIG. 10 is a workflow diagram of an example of a testing workflow according to an embodiment.

Turning now to FIG. 10, an embodiment of a workflow 100 for testing a super-resolution network based on foveated rendering may include starting with a dataset of training images used as input to the super-resolution network at block 101. For each input image to be rendered at block 101, an image for the central vision may be extracted at block 102 and provided to the trained super-resolution network at block 103. The super-resolution network may provide an enhanced image with the central vision region being enhanced with super-resolution at block 104. In parallel, any suitable up-sampling technique may be applied to the input image at block 105 (e.g., bi-cubic) to generate a high resolution up-sampled image for the input image (e.g., for the remaining peripheral regions of the input image outside the central vision region). The results of the super-resolution network may then be fused with the up-sampled image at block 106, where the central vision region takes values from the super-resolution output, to provide a foveated image at block 107. Because the super-resolution network may be trained to have sharp images in the central portion with similar blurry characteristics as the up-sampling technique applied at block 105 in the peripheral portion, a smooth transition between the central vision and the peripheral vision may be achieved.

Region of Interest Examples

In some embodiments of super-resolution foveated rendering, a ROI may be identified which may be based on a proximity to the focus area. For example, the size of the ROI may be selected based on study of human visual preferences. For example, the size of the ROI may be different for different users, content (e.g., movies versus games), and/or other contextual factors. In some embodiments, super-resolution based foveated rendering may be combined with other foveated rendering/coding techniques for further performance/quality trade-offs. For example, any additional image area outside of the ROI may be handled at the same settings, or may be further degraded in some embodiments.

Turning now to FIGS. 11A to 11F, embodiments of regions of interest for foveated encoding may be represented by any of a variety of different shapes and sizes. An image area 110 may generally have a rectangular shape or a square shape. A focus area 112 may have any suitable shape such as circular (e.g., FIG. 11A), elliptical (e.g., FIGS. 11B and 11D), square or rectangular (e.g., FIG. 11E), a point (e.g., FIG. 11C), or arbitrary (e.g., FIG. 11F). A ROI 114 may have any suitable shape such as a square (e.g., FIGS. 11A, 11C, and 11E) or a rectangle (e.g., FIGS. 11B, 11D, and 11F). The size of the ROI 114 may be fixed or may be adjusted based on the size of the focus area 112. For example, the size of the ROI 114 may correspond to the size of the focus area 112 plus some delta X and delta Y (e.g., which may be different from each other). The ROI 114 may generally be bigger than the focus area 112 to provide a smooth transition between the relatively higher quality central vision region and the relatively lower quality peripheral vision region.

In some embodiments, the values for the focus area, delta X, and/or delta Y may be configurable (e.g., per user, content, context, etc.). For example, the user may select from a set of pre-determined ROI sizes to decide which foveated viewing experience they like best. For example, some people may be more sensitive to changes in the periphery and may prefer a larger ROI relative to the focus area. In some embodiments, there may be a calibration per user. For example, a calibration may provide a precise user ROI size. Generally, eye trackers involve some user calibration. ROI size calibration may be done at same time as eye tracker calibration. The calibration may be based on, for example, a just noticeable difference (JND). During a calibration phase, the user may be asked to focus on an area and give a response when they notice a detail change in the periphery. Or the user may be asked if two images appear the same on the periphery, when in fact there is some difference between the level of detail in the images (e.g. to determine how much variation is perceived by the user). In some embodiments, the calibration or other settings may be user adjustable (e.g. setting/slider bar for more detail/less detail in the periphery) or included as part of various performance/quality settings. The super-resolution network may be trained to work with a variety of ROI sizes to accommodate dynamic adjustment of the ROI size.

Figure 11A:
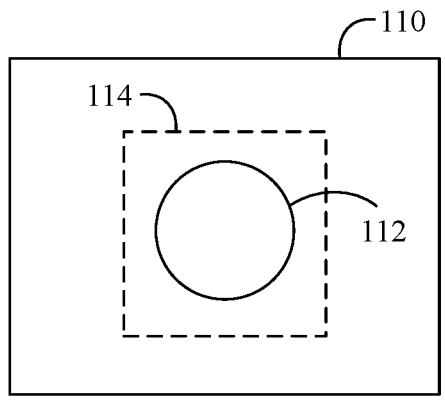
FIGS. 11A to 11F are illustrative diagrams of examples of regions of interest according to an embodiment.
Figure 11B:
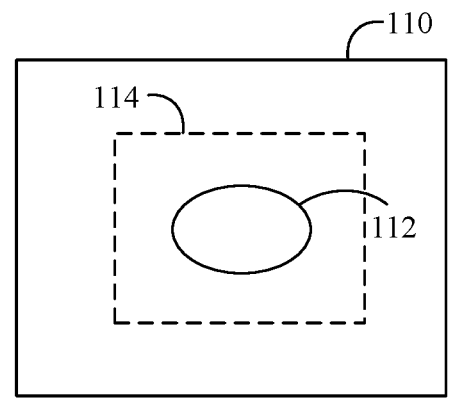
Figure 11C:
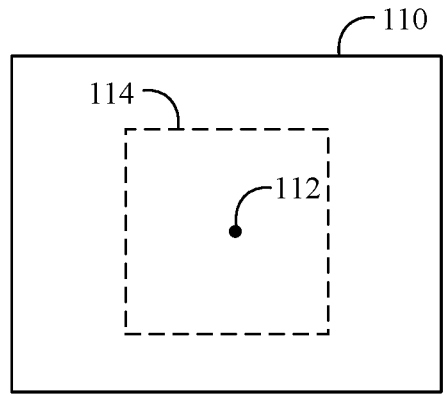
Figure 11D:
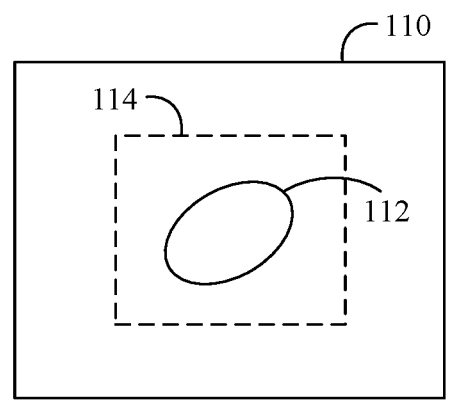
Figure 11E:
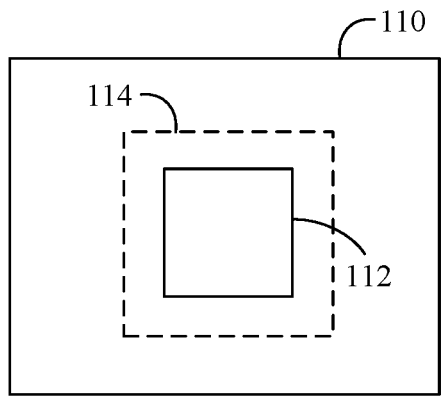
Figure 11F:
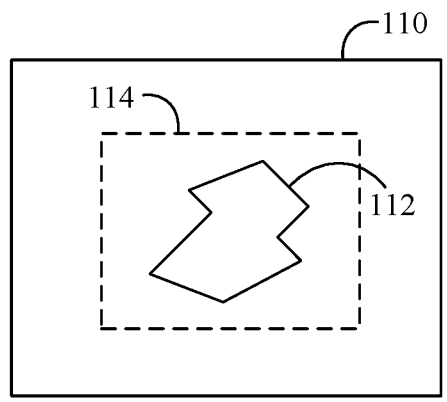
Figure 11G:
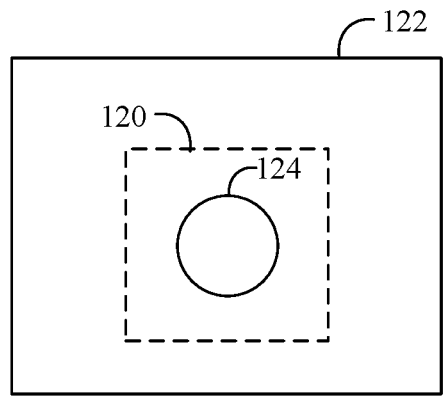
FIGS. 11G to 11H are illustrative diagrams of examples of super-resolution foveated encoding according to an embodiment.
Figure 11H:
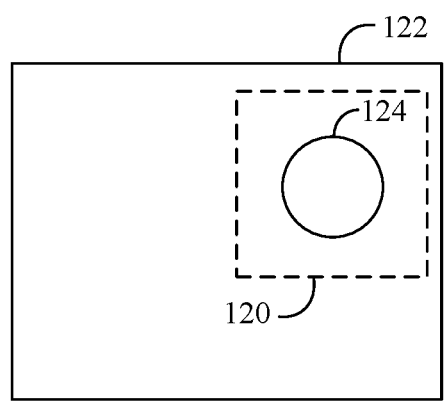

Turning now to FIGS. 11G and 11H, an embodiment of a ROI 120 may be applied to an image area 122 based on a focus area 124. For example, if the focus area 124 is roughly centered (e.g., if the focus area 124 is fixed, or that is where the user is looking), the ROI 120 may also be roughly centered when applied to the image area 122 (e.g., see FIG. 11G). If the focus area 124 moves (e.g., based on gaze information, motion information, content, etc.), the ROI 120 may likewise move in the image area 122 based on the new focus area 124 (e.g., see FIG. 11H). When rendering the image area 122, for example, the portion of the image area 122 corresponding to the ROI 120 may be rendered with super-resolution for higher quality in the focus area 124.

Figure 12:
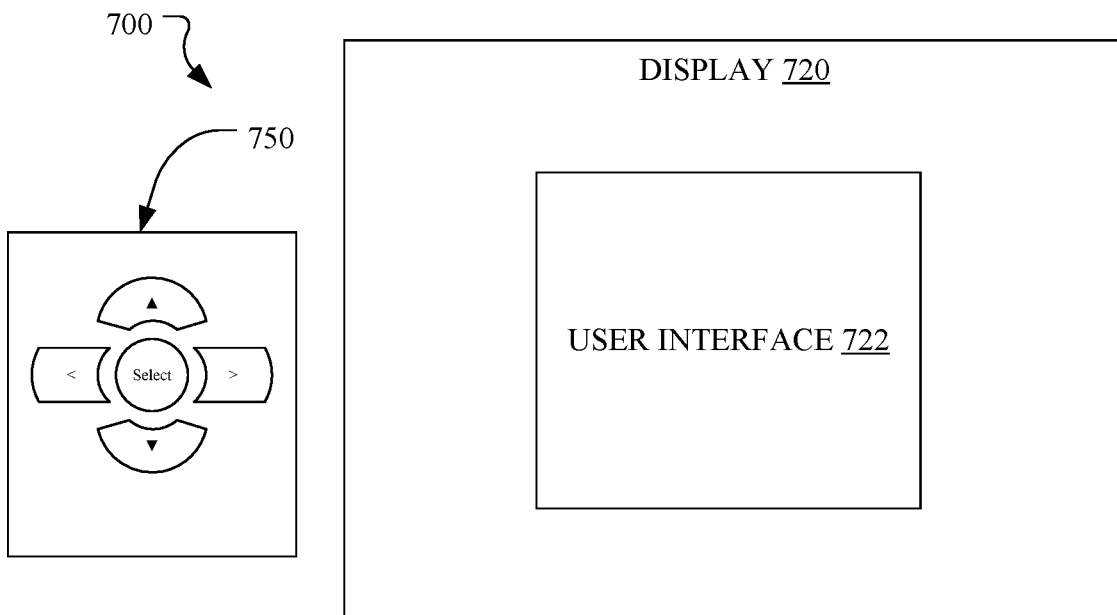
FIG. 12 is a block diagram of an example of a system having a navigation controller according to an embodiment.
Figure 12:
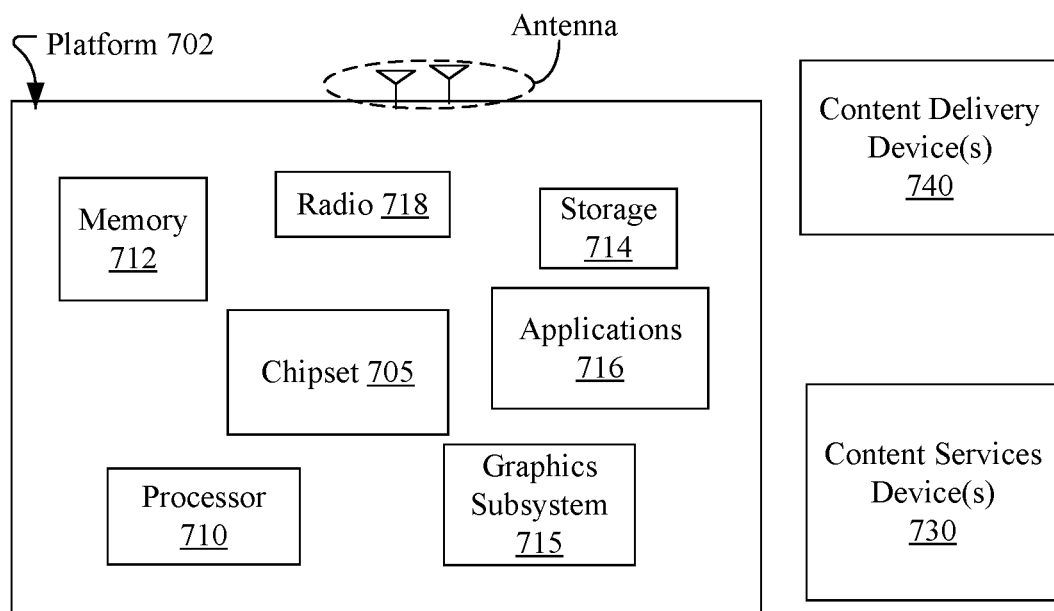
Figure 12:
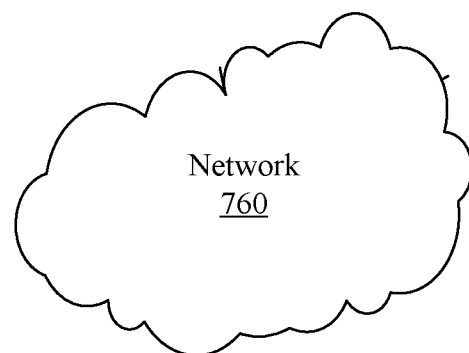

FIG. 12 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
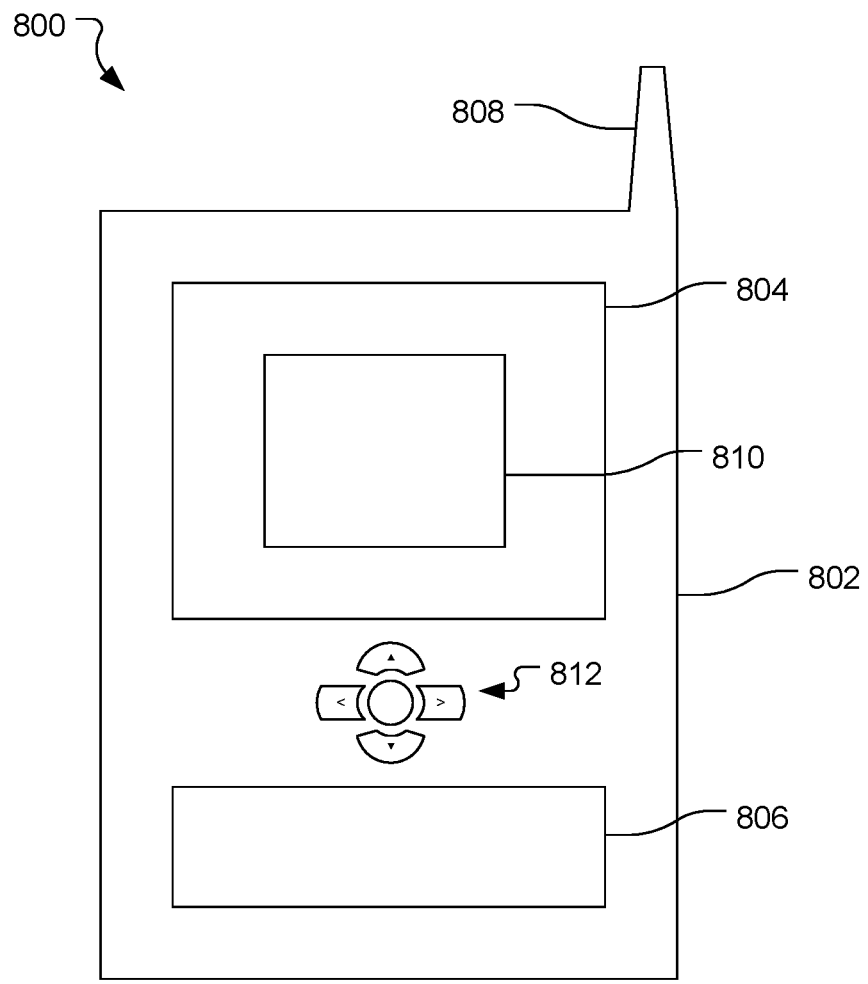
FIG. 13 is a block diagram of an example of a system having a small form factor according to an embodiment.

As described above, the system 700 may be embodied in varying physical styles or form factors. FIG. 13 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 13, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

In accordance with some embodiments, the system 700 and/or the device 800 may be advantageously configured with one or more features of a super-resolution based foveated renderer and/or training/testing of a super-resolution network as described herein. For example, the system 700 and/or the device 800 may include one or more of the features described in the below Additional Notes and Examples.

Additional Notes and Examples

Example 1 may include an electronic processing system, comprising a graphics processor, memory communicatively coupled to the graphics processor, and logic communicatively coupled to the graphics processor to identify a region of interest portion of a first image, and render the region of interest portion with super-resolution.

Example 2 may include the system of Example 1, wherein the logic is further to provide the region of interest portion of the first image to a super-resolution network to generate a super-resolution enhanced image, up-sample the first image to generate an up-sampled image, and combine the super-resolution enhanced image with the up-sampled image to provide a foveated image.

Example 3 may include the system of Example 1, wherein the logic is further to train a super-resolution network to provide a smooth transition between the region of interest portion of the first image and other portions of the first image.

Example 4 may include the system of Example 3, wherein the logic is further to crop a training image based on the region of interest to generate a cropped image, down-sample the cropped image to generate a down-sampled image, up-sample the down-sampled image to generate an up-sampled image, and blend the up-sampled image with the cropped image to generate a target image.

Example 5 may include the system of Example 4, wherein the logic is further to train the super-resolution network with the down-sampled image as an input image for the super-resolution network and the target image as a target output image for the super-resolution network.

Example 6 may include the system of any of Examples 1 to 5, wherein a resolution of the first image is lower than a resolution of a target display.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to identify a region of interest portion of a first image, and render the region of interest portion with super-resolution.

Example 8 may include the apparatus of Example 7, wherein the logic is further to provide the region of interest portion of the first image to a super-resolution network to generate a super-resolution enhanced image, up-sample the first image to generate an up-sampled image, and combine the super-resolution enhanced image with the up-sampled image to provide a foveated image.

Example 9 may include the apparatus of Example 7, wherein the logic is further to train a super-resolution network to provide a smooth transition between the region of interest portion of the first image and other portions of the first image.

Example 10 may include the apparatus of Example 9, wherein the logic is further to crop a training image based on the region of interest to generate a cropped image, down-sample the cropped image to generate a down-sampled image, up-sample the down-sampled image to generate an up-sampled image, and blend the up-sampled image with the cropped image to generate a target image.

Example 11 may include the apparatus of Example 10, wherein the logic is further to train the super-resolution network with the down-sampled image as an input image for the super-resolution network and the target image as a target output image for the super-resolution network.

Example 12 may include the apparatus of any of Examples 7 to 11, wherein a resolution of the first image is lower than a resolution of a target display.

Example 13 may include a method of rendering an image, comprising identifying a region of interest portion of a first image, and rendering the region of interest portion with super-resolution.

Example 14 may include the method of Example 13, further comprising providing the region of interest portion of the first image to a super-resolution network to generate a super-resolution enhanced image, up-sampling the first image to generate an up-sampled image, and combining the super-resolution enhanced image with the up-sampled image to provide a foveated image.

Example 15 may include the method of Example 13, further comprising training a super-resolution network to provide a smooth transition between the region of interest portion of the first image and other portions of the first image.

Example 16 may include the method of Example 15, further comprising cropping a training image based on the region of interest to generate a cropped image, down-sampling the cropped image to generate a down-sampled image, up-sampling the down-sampled image to generate an up-sampled image, and blending the up-sampled image with the cropped image to generate a target image.

Example 17 may include the method of Example 16, further comprising training the super-resolution network with the down-sampled image as an input image for the super-resolution network and the target image as a target output image for the super-resolution network.

Example 18 may include the method of any of Examples 13 to 17, wherein a resolution of the first image is lower than a resolution of a target display.

Example 19 may include at least one computer readable medium, comprising a set of instructions, which when executed by a computing device, cause the computing device to identify a region of interest portion of a first image, and render the region of interest portion with super-resolution.

Example 20 may include the at least one computer readable medium of Example 19, comprising a further set of instructions, which when executed by the computing device, cause the computing device to provide the region of interest portion of the first image to a super-resolution network to generate a super-resolution enhanced image, up-sample the first image to generate an up-sampled image, and combine the super-resolution enhanced image with the up-sampled image to provide a foveated image.

Example 21 may include the at least one computer readable medium of Example 19, comprising a further set of instructions, which when executed by the computing device, cause the computing device to train a super-resolution network to provide a smooth transition between the region of interest portion of the first image and other portions of the first image.

Example 22 may include the at least one computer readable medium of Example 21, comprising a further set of instructions, which when executed by the computing device, cause the computing device to crop a training image based on the region of interest to generate a cropped image, down-sample the cropped image to generate a down-sampled image, up-sample the down-sampled image to generate an up-sampled image, and blend the up-sampled image with the cropped image to generate a target image.

Example 23 may include the at least one computer readable medium of Example 22, comprising a further set of instructions, which when executed by the computing device, cause the computing device to train the super-resolution network with the down-sampled image as an input image for the super-resolution network and the target image as a target output image for the super-resolution network.

Example 24 may include the at least one computer readable medium of any of Examples 19 to 23, wherein a resolution of the first image is lower than a resolution of a target display.

Example 25 may include a video processor apparatus, comprising means for identifying a region of interest portion of a first image, and means for rendering the region of interest portion with super-resolution.

Example 26 may include the method of Example 25, further comprising means for providing the region of interest portion of the first image to a super-resolution network to generate a super-resolution enhanced image, means for up-sampling the first image to generate an up-sampled image, and means for combining the super-resolution enhanced image with the up-sampled image to provide a foveated image.

Example 27 may include the method of Example 25, further comprising means for training a super-resolution network to provide a smooth transition between the region of interest portion of the first image and other portions of the first image.

Example 28 may include the method of Example 27, further comprising means for cropping a training image based on the region of interest to generate a cropped image, means for down-sampling the cropped image to generate a down-sampled image, means for up-sampling the down-sampled image to generate an up-sampled image, and means for blending the up-sampled image with the cropped image to generate a target image.

Example 29 may include the method of Example 28, further comprising means for training the super-resolution network with the down-sampled image as an input image for the super-resolution network and the target image as a target output image for the super-resolution network.

Example 30 may include the method of any of Examples 25 to 29, wherein a resolution of the first image is lower than a resolution of a target display.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system comprising:
   a graphics processor;
   memory communicatively coupled to the graphics processor; and
   logic communicatively coupled to the graphics processor to:
   identify a region of interest portion of a first image,
   provide the region of interest portion of the first image to a super-resolution neural network to generate a super-resolution enhanced image which corresponds to an increase of resolution relative to a resolution of the first image,
   up-sample the first image to generate an up-sampled image,
   combine the super-resolution enhanced image with the up-sampled image to provide a foveated image, and
   train the super-resolution neural network to provide a blended transition between the region of interest portion of the first image and other portions of the first image.

2. The system of claim 1, wherein the logic is further to:
   crop a training image based on the region of interest to generate a cropped image;
   down-sample the cropped image to generate a down-sampled image;
   up-sample the down-sampled image to generate an up-sampled second image; and
   blend the up-sampled second image with the cropped image to generate a target image.

3. The system of claim 2, wherein the logic is further to:
   train the super-resolution neural network with the down-sampled image as an input image for the super-resolution network and the target image as a target output image for the super-resolution network.

4. The system of claim 1, wherein the resolution of the first image is lower than a resolution of a target display device.

5. A semiconductor package apparatus comprising:
   one or more substrates; and
   logic coupled to the one or more substrates, wherein the logic is at least partly implemented in one or more of configurable logic and fixed-functionality hardware logic, the logic coupled to the one or more substrates to:
   identify a region of interest portion of a first image,
   provide the region of interest portion of the first image to a super-resolution neural network to generate a super-resolution enhanced image which corresponds to an increase of resolution relative to a resolution of the first image, up-sample the first image to generate an up-sampled image,
combine the super-resolution enhanced image with the up-sampled image to provide a foveated image, and
train the super-resolution neural network to provide a blended transition between the region of interest portion of the first image and other portions of the first image.

6. The apparatus of claim 5, wherein the logic is further to:
crop a training image based on the region of interest to generate a cropped image;
down-sample the cropped image to generate a down-sampled image;
up-sample the down-sampled image to generate an up-sampled second image; and
blend the up-sampled second image with the cropped image to generate a target image.

7. The apparatus of claim 6, wherein the logic is further to:
train the super-resolution neural network with the down-sampled image as an input image for the super-resolution network and the target image as a target output image for the super-resolution network.

8. The apparatus of claim 5, wherein the resolution of the first image is lower than a resolution of a target display device.

9. A method of processing an image, comprising:
cropping a training image to generate a cropped image;
down-sampling the cropped image to generate a down-sampled image;
up-sampling the down-sampled image to generate an up-sampled image;
blending the up-sampled image with the cropped image to generate a target image; and
training a super-resolution network with the down-sampled image as an input image for the super-resolution network and the target image as a target output image for the super-resolution network.

10. The method of claim 9, further comprising:
identifying a region of interest portion of a first image;
providing the region of interest portion of the first image to the trained super-resolution network to generate a super-resolution enhanced image which corresponds to an increase of resolution relative to a resolution of the first image;
up-sampling the first image to generate an up-sampled second image; and
combining the super-resolution enhanced image with the up-sampled second image to provide a foveated image.

11. The method of claim 10, wherein the resolution of the first image is lower than a resolution of a target display device.

12. The method of claim 9, wherein the super-resolution network comprises a super-resolution neural network.

13. The method of claim 12, wherein the super-resolution neural network comprises a super-resolution convolutional neural network.

14. At least one non-transitory computer readable medium, comprising a set of instructions, which when executed by a computing device, cause the computing device to:
crop a training image to generate a cropped image;
down-sample the cropped image to generate a down-sampled image;
up-sample the down-sampled image to generate an up-sampled image;
blend the up-sampled image with the cropped image to generate a target image; and
train a super-resolution network with the down-sampled image as an input image for the super-resolution network and the target image as a target output image for the super-resolution network.

15. The at least one non-transitory computer readable medium of claim 14, comprising a further set of instructions, which when executed by the computing device, cause the computing device to:
identify a region of interest portion of a first image;
provide the region of interest portion of the first image to the trained super-resolution network to generate a super-resolution enhanced image which corresponds to an increase of resolution relative to a resolution of the first image;
up-sample the first image to generate an up-sampled second image; and
combine the super-resolution enhanced image with the up-sampled second image to provide a foveated image.

16. The at least one non-transitory computer readable medium of claim 15, wherein the resolution of the first image is lower than a resolution of a target display device.

17. The at least one non-transitory computer readable medium of claim 14, wherein the super-resolution network comprises a super-resolution neural network.

18. The at least one non-transitory computer readable medium of claim 17, wherein the super-resolution neural network comprises a super-resolution convolutional neural network.

* * * * *